(12) United States Patent
Reddy

(10) Patent No.: US 10,005,930 B2
(45) Date of Patent: Jun. 26, 2018

(54) PENDANT EPOXIDE POLYMERS AND METHODS OF TREATING SUBTERRANEAN FORMATIONS

(71) Applicant: Saudi Arabian Oil Company, Dhahran (SA)

(72) Inventor: B. Raghava Reddy, Pearland, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days. days.

(21) Appl. No.: 15/263,661

(22) Filed: Sep. 13, 2016

(65) Prior Publication Data

US 2017/0073555 A1 Mar. 16, 2017

Related U.S. Application Data

(60) Provisional application No. 62/218,152, filed on Sep. 14, 2015.

(51) Int. Cl.
| | | |
|---|---|---|
| *C09J 123/08* | (2006.01) |
| *E21B 33/14* | (2006.01) |
| *C09K 8/512* | (2006.01) |
| *C08G 59/32* | (2006.01) |
| *C09K 8/035* | (2006.01) |
| *C09K 8/42* | (2006.01) |
| *C09K 8/44* | (2006.01) |

(52) U.S. Cl.
CPC .... *C09J 123/0884* (2013.01); *C08G 59/3209* (2013.01); *C09K 8/035* (2013.01); *C09K 8/428* (2013.01); *C09K 8/44* (2013.01); *C09K 8/512* (2013.01); *E21B 33/14* (2013.01)

(58) Field of Classification Search
CPC ................................ C08L 33/068; C09K 8/04
See application file for complete search history.

(56) References Cited

U.S. PATENT DOCUMENTS

| | | | |
|---|---|---|---|
| 4,049,750 A | 9/1977 | Brenner | |
| 4,255,537 A | 3/1981 | Fields | |
| 4,420,588 A | 12/1983 | Yoshioka | |
| 4,773,481 A | 9/1988 | Allison | |
| 4,882,399 A | 11/1989 | Tesoro et al. | |
| 6,192,986 B1 | 2/2001 | Urlwin-Smith | |
| 6,225,376 B1 | 5/2001 | Klein et al. | |
| 6,245,835 B1 | 6/2001 | Klein et al. | |
| 6,384,134 B1 | 5/2002 | Hall et al. | |
| 6,431,280 B2 | 8/2002 | Bayliss et al. | |
| 6,433,097 B1* | 8/2002 | Nixon | C08F 2/06 427/340 |
| 6,509,039 B1 | 1/2003 | Nies | |
| 6,710,139 B2 | 3/2004 | Hoyles et al. | |
| 7,527,858 B2 | 5/2009 | Lundquist | |
| 7,814,980 B2 | 10/2010 | Bryant et al. | |
| 9,283,299 B2 | 3/2016 | Mikos et al. | |
| 9,321,956 B2 | 4/2016 | Nguyen et al. | |
| 2003/0181543 A1 | 9/2003 | Reddy | |
| 2005/0079222 A1 | 4/2005 | Arbos | |
| 2010/0016179 A1 | 1/2010 | Duncum et al. | |
| 2013/0220612 A1 | 8/2013 | Karcher et al. | |
| 2013/0233546 A1 | 9/2013 | Liang et al. | |
| 2013/0269819 A1* | 10/2013 | Ruby | F16L 9/147 138/141 |
| 2013/0306314 A1 | 11/2013 | Curtice | |
| 2014/0128296 A1 | 5/2014 | Soane | |
| 2016/0122625 A1 | 5/2016 | Singh et al. | |

FOREIGN PATENT DOCUMENTS

| | | |
|---|---|---|
| DE | 102013219325 | 3/2015 |
| EP | 898050 | 2/1999 |
| EP | 2444455 | 4/2012 |
| GB | 2444158 | 5/2008 |
| WO | 2015088515 | 6/2015 |

OTHER PUBLICATIONS

International Search Report and Written Opinion issued in International Application No. PCT/US2016/051533 dated Nov. 22, 2016; 14 pages.
International Search Report and Written Opinion issued in International Application No. PCT/US2016/051507 dated Nov. 18, 2016; 11 pages.
Senkal et al, "Glycidyl Methacrylate based Polymer Resins with Diethylene Triamine Tetra Acetic Acid Functions for Efficient Removal of Ca(II) and Mg(II)," Reactive & Functional Polymers, Published in 2001, pp. 151-157.
Gunbas, "Progress in Organic Coatings," vol. 76, No. 12, Dec. 2013; pp. 1720-1725.

\* cited by examiner

*Primary Examiner* — Kuo Liang Peng
(74) *Attorney, Agent, or Firm* — Fish & Richardson P.C.

(57) ABSTRACT

This document relates to compositions including a crosslinkable polymer including a pendant epoxide repeat unit and an amine crosslinker, and methods of treating a subterranean formation by providing the composition to the formation. The pendant epoxide repeat unit has the structure

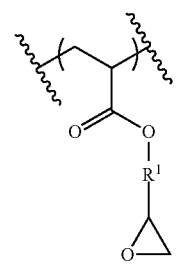

Each $R^1$ is independently a $(C_1\text{-}C_{10})$ alkylene or $(C_1\text{-}C_{10})$ alkylene ether, each alkylene ether independently having a ratio of carbon atoms to oxygen atoms of 1:1 to 4:1.

20 Claims, No Drawings

PENDANT EPOXIDE POLYMERS AND METHODS OF TREATING SUBTERRANEAN FORMATIONS

CROSS-REFERENCE TO RELATED APPLICATION

This application claims the benefit of U.S. Application Ser. No. 62/218,152 entitled "PENDANT EPOXIDE POLYMERS AND METHODS OF TREATING SUBTERRANEAN FORMATIONS" filed on Sep. 14, 2015, which is herein incorporated by reference in its entirety.

TECHNICAL FIELD

This document relates to methods and compositions used in treating subterranean formations.

SUMMARY

Provided in this disclosure is a composition including a crosslinkable polymer including a pendant epoxide repeat unit and an amine crosslinker. The pendant epoxide repeat unit has the structure:

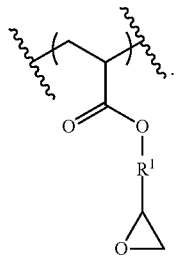

Each $R^1$ is independently a ($C_1$-$C_{10}$) alkylene or ($C_1$-$C_{10}$) alkylene ether. The number of oxygen atoms in each alkylene ether is governed at least in part by the number of carbon atoms in the alkylene ether. In some embodiments, each alkylene ether independently has a ratio of carbon atoms to oxygen atoms of 1:1 to 4:1. In one example, the alkylene ether includes ethylene oxide units, and the ratio of carbon atoms to oxygen atoms is 2:1. In another example, the alkylene ether include propylene oxide units, and the ratio of carbon atoms to oxygen atoms is 3:1.

In some embodiments, each $R^1$ is independently a ($C_1$-$C_4$) alkylene or ($C_1$-$C_4$) alkylene ether. In some embodiments, each alkylene ether independently has a ratio of carbon atoms to oxygen atoms in a range of 1:1 to 4:1.

In some embodiments, each $R^1$ is —$CH_2$—.

In some embodiments, the pendant epoxide repeat unit is about 1% to about 30% by weight of the crosslinkable polymer. For example, the pendant epoxide repeat unit can be about 5% to about 15% by weight of the crosslinkable polymer.

In some embodiments, the crosslinkable polymer further includes a hydrocarbylene repeat unit. The hydrocarbylene repeat unit can be a substituted or unsubstituted ($C_2$-$C_{15}$) hydrocarbylene. In some embodiments, the hydrocarbylene repeat unit is a substituted or unsubstituted ($C_2$-$C_4$) hydrocarbylene. For example, the hydrocarbylene repeat unit can be a substituted or unsubstituted ($C_2$-$C_4$) alkylene. In some embodiments, the hydrocarbylene repeat unit is an unsubstituted $C_2$ alkylene (—$CH_2CH_2$—).

In some embodiments, the hydrocarbylene repeat unit is about 50% to about 99% by weight of the crosslinkable polymer. For example, the hydrocarbylene repeat unit can be about 60% to about 80% by weight of the crosslinkable polymer.

In some embodiments, the crosslinkable polymer further includes an ester repeat unit having the structure:

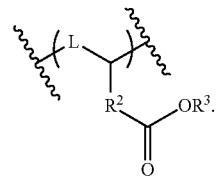

Each L is independently a substituted or unsubstituted ($C_1$-$C_{10}$) hydrocarbylene. Each $R^2$ is independently a bond or a substituted or unsubstituted ($C_1$-$C_{10}$) hydrocarbylene. Each $R^3$ is independently H or a substituted or unsubstituted ($C_1$-$C_{10}$) hydrocarbyl.

In some embodiments, each L is independently a substituted or unsubstituted ($C_1$-$C_4$) alkylene. In one example, each L is —$CH_2$—.

In some embodiments, each $R^2$ is independently a substituted or unsubstituted ($C_1$-$C_8$) hydrocarbylene. In one example, each $R^2$ is independently a substituted or unsubstituted ($C_1$-$C_4$) alkylene. In some embodiments, $R^2$ is a bond.

In some embodiments, each $R^3$ is independently a substituted or unsubstituted ($C_1$-$C_8$) hydrocarbyl. In one example, each $R^3$ is independently a substituted or unsubstituted ($C_1$-$C_4$) hydrocarbyl. In some embodiments, each $R^3$ is —$CH_3$.

In some embodiments, the ester repeat unit is about 10% to about 40% by weight of the crosslinkable polymer. For example, the ester repeat unit can be about 20% to about 30% by weight of the crosslinkable polymer.

In some embodiments, the crosslinkable polymer includes a pendant epoxide repeat unit having the structure:

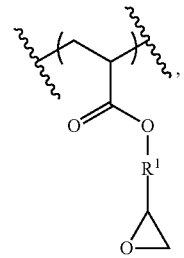

where each $R^1$ is —$CH_2$—; a hydrocarbylene repeat unit having the structure:

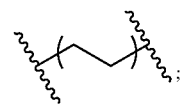

and
an ester repeat unit having the structure:

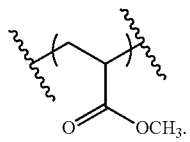

The pendant epoxide repeat unit can be about 5% to about 15% by weight of the crosslinkable polymer. The hydrocarbylene repeat unit can be about 60% to about 80% by weight of the crosslinkable polymer. The ester repeat unit can be about 20% to about 30% by weight of the crosslinkable polymer.

In some embodiments, the crosslinkable polymer has a melt index of about 4 g/10 min to about 8 g/10 min. For example, the crosslinkable polymer can have a melt index of about 6 g/10 min.

In some embodiments, the crosslinkable polymer has a melting point of about 50° C. to about 80° C. For example, the crosslinkable polymer can have a melting point of about 65° C.

In some embodiments, the crosslinkable polymer has a Vicat softening point of less than about 60° C. For example, the crosslinkable polymer can have a Vicat softening point of less than about 40° C.

In some embodiments, the crosslinkable polymer has a tensile strength of about 3 MPa to about 5 MPa. For example, the crosslinkable polymer can have a tensile strength of about 4 MPa.

In some embodiments, the crosslinkable polymer has a Shore D hardness of about 10 to about 25. For example, the crosslinkable polymer can have a Shore D hardness of about 18.

The amine crosslinker contains at least two primary amine groups. In some embodiments, the amine crosslinker includes a polyalkyleneimine, a polyetheramine, a polyalkylenepolyamine, an aliphatic amine, a polyfunctional aliphatic amine, an arylalkylamine, a heteroarylalkylamine, a chitosan, and combinations thereof. For example, the amine crosslinker can include at least one of a polyethyleneimine, an ethylenediamine, a diethylenetriamine (DETA), a triethylenetetramine (TETA), a tetraethylenepentamine (TEPA), a 1,2-propylenediamine, a 1,3-propylenediamine, a dipropylenetriamine, a tripropylenetetramine, a tetrapropylenepentamine, an ethylene propylene triamine, an ethylene dipropylene tetramine, a diethylene propylene pentamine, an ethylene tripropylene pentamine, a diethylene dipropylene pentamine, a triethylene propylene pentamine, a polyethylenimine (e.g., EPOMIN® from Nippon Shokubai, LUPASOL™ from BASF, LUPAMINE™ from BASF, etc.), a poly(ethyleneoxy)amine (e.g., JEFFAMINE® EDR-148 from Huntsman Corporation), a poly(propyleneoxy)amine (e.g., JEFFAMINE® T-403 from Huntsman Corporation, Polyetheramine T-5000 from BASF) and combinations thereof. Additionally, the amine crosslinker can be selected from the group consisting of a polyethyleneimine, a poly(ethyleneoxy)amine, a tetraethylenepentamine or combinations thereof. The polyethyleneimine can have a weight average molecular weight of about 1,800 Da.

In some embodiments, the weight ratio of the crosslinkable polymer to the amine crosslinker is about 10:1 to about 1:2.

In some embodiments, the composition further comprises a carrier solvent. The carrier solvent can be a non-aqueous based fluid. The carrier solvent can be a hydrocarbon based fluid. In some embodiments, the carrier solvent can be selected from the group consisting of kerosene, xylenes, toluene, diesel, mineral oils, high aromatic content naphthenic oils, synthetic oils, paraffins, and combinations thereof.

In some embodiments, the crosslinkable polymer and amine crosslinker are about 1% to about 50% by weight of the composition. For example, the crosslinkable polymer and amine crosslinker can be about 3% to about 10% by weight of the composition. In some embodiments, the crosslinkable polymer and amine crosslinker are about 6% to about 7% by weight of the composition.

In some embodiments, the composition has a gel time of less than about 120 hours at about 80° C. In some embodiments, the composition has a gel time of less than about 48 hours at about 80° C. For example, the composition can have a gel time of less than about 24 hours at about 80° C. In some embodiments, the composition has a gel time of less than about 6 hours at about 80° C.

Also, provided in this disclosure is a composition including a crosslinkable polymer, an amine crosslinker, and a non-aqueous based fluid. The crosslinkable polymer includes a pendant epoxide repeat unit, a hydrocarbylene repeat unit, and an ester repeat unit. The pendant epoxide repeat unit has the structure:

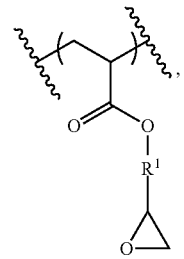

where each $R^1$ is —$CH_2$—. The hydrocarbylene repeat unit has the structure:

The ester repeat unit has the structure:

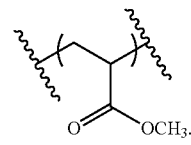

The pendant epoxide repeat unit is about 5% to about 15% by weight of the crosslinkable polymer. The hydrocarbylene repeat unit is about 60% to about 80% by weight of the crosslinkable polymer. The ester repeat unit is about 20% to about 30% by weight of the crosslinkable polymer. The amine crosslinker is selected from the group consisting of a polyethyleneimine having a molecular weight of about 1,800 Da or less, a poly(ethyleneoxy)amine, a tetraethylenepentamine, and combinations thereof. The non-aqueous based fluid is selected from the group consisting of diesel, xylenes, and combinations thereof. The crosslinkable polymer and amine crosslinker are about 3% to about 10% by weight of the composition, respectively.

Additionally, provided in this disclosure is a method of treating a subterranean formation. The method includes providing in a subterranean formation a composition including a crosslinkable polymer and an amine crosslinker. The crosslinkable polymer includes a pendant epoxide repeat unit. The pendant epoxide repeat unit has the structure:

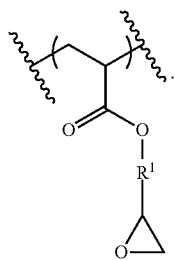

Each $R^1$ is independently a $(C_1-C_{10})$ alkylene or $(C_1-C_{10})$ alkylene ether. The number of oxygen atoms in each alkylene ether is governed at least in part by the number of carbon atoms in the alkylene ether. In some embodiments, each alkylene ether independently has a ratio of carbon atoms to oxygen atoms of 1:1 to 4:1. The method further includes crosslinking the composition to form a crosslinked product thereof.

In some embodiments, the crosslinked product is a sealant. For example, the crosslinked product thereof can be a sealant gel.

In some embodiments, the providing occurs above-surface (e.g., the composition is prepared above-surface). The providing can also occur in the subterranean formation (e.g., the composition is prepared in the subterranean formation).

In some embodiments, forming the sealant occurs near at least one of a casing, a casing-casing annulus, or in a tubing-casing annulus. In some embodiments, forming the sealant occurs in a void in at least one of a cement sheath, pipe, and near wellbore subterranean formation, or at a related interface.

In some embodiments, the sealant prevents or retards undesired loss or leak off of fluid into the formation.

DETAILED DESCRIPTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods of manufacturing described herein, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain alkyl groups and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4-2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "aralkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl. Aralkenyl groups are alkenyl groups as defined herein in which a hydrogen or carbon bond of an alkyl group is replaced with a bond to an aryl group as defined herein.

The term "heterocyclyl" as used herein refers to aromatic and non-aromatic ring compounds containing three or more ring members, of which one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a C2-heterocyclyl can be a 5-ring with two carbon atoms and three heteroatoms, a 6-ring with two carbon atoms and four heteroatoms and so forth. Likewise a C4-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The term "heterocyclylalkyl" as used herein refers to alkyl groups as defined herein in which a hydrogen or carbon bond of an alkyl group as defined herein is replaced with a bond to a heterocyclyl group as defined herein. Representative heterocyclyl alkyl groups include, but are not limited to, furan-2-yl methyl, furan-3-yl methyl, pyridine-3-yl methyl, tetrahydrofuran-2-yl ethyl, and indol-2-yl propyl.

The term "heteroarylalkyl" as used herein refers to alkyl groups as defined herein in which a hydrogen or carbon bond of an alkyl group is replaced with a bond to a heteroaryl group as defined herein.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having, e.g., the formula N(group)$_3$ wherein each group is independently H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, another liquid, or a gas. Non-limiting examples of solvents are silicones, organic compounds, water, alcohols, ionic liquids, and supercritical fluids.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having $n_i$ molecules of molecular weight $M_i$ through the formula $M_n = \Sigma M_i n_i / \Sigma n_i$. The number-average molecular weight can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "room temperature" as used herein refers to a temperature of about 15° C. to about 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a C2-C40 fatty acid C1-C10 alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

Compositions and Reaction Products Thereof

Provided in this disclosure is a composition including a crosslinkable polymer including a pendant epoxide repeat unit and an amine crosslinker. The pendant epoxide repeat unit has the structure:

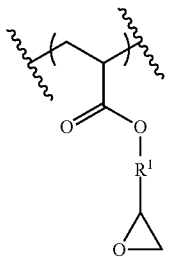

Each $R^1$ is independently a ($C_1$-$C_{10}$) alkylene or ($C_1$-$C_{10}$) alkylene ether. The number of oxygen atoms in each alkylene ether is governed at least in part by the number of carbon atoms in the alkylene ether. In some embodiments, each alkylene ether independently has a ratio of carbon atoms to oxygen atoms of 1:1 to 4:1. In one example, the alkylene ether includes ethylene oxide units, and the ratio of carbon atoms to oxygen atoms is 2:1. In another example, the alkylene ether include propylene oxide units, and the ratio of carbon atoms to oxygen atoms is 3:1.

In some embodiments, each $R^1$ is independently a ($C_1$-$C_4$) alkylene or ($C_1$-$C_4$) alkylene ether. In some embodiments, each alkylene ether independently has a ratio of carbon atoms to oxygen atoms in a range of 1:1 to 4:1.

In some embodiments, each $R^1$ or at least one $R^1$ is —$CH_2$—.

In some embodiments, the composition includes cross-linked reaction products of the crosslinkable polymer and the amine crosslinker. The crosslinked reaction product can form a sealant (e.g., a sealant gel). In some embodiments, the sealant is a stiff gel, a ringing gel, or a lipping gel.

In some embodiments, each $R^1$ is independently selected from a ($C_1$-$C_4$) alkylene (e.g., a methylene, an ethylene, a propylene, or a butylene). For example, the pendant epoxide repeat unit can have the structure:

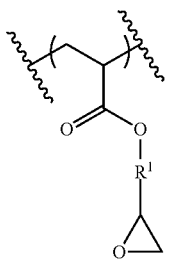

where each $R^1$ is methylene.

In some embodiments, the pendant epoxide repeat unit is about 1% to about 30% by weight of the crosslinkable polymer. For example, the pendant epoxide repeat unit can be about 3% to about 25% or about 4% to about 20% by weight of the crosslinkable polymer or about 1%, 3%, 5%, 7%, 10%, 15%, 20%, 25%, or about 30% by weight of the crosslinkable polymer. In some embodiments, the pendant epoxide repeat unit is about 5% to about 15% by weight of the crosslinkable polymer. For example, the pendant epoxide repeat unit can be about 6% to about 10% by weight of the crosslinkable polymer. In some embodiments, the pendant epoxide repeat unit is about 8% by weight of the crosslinkable polymer.

In some embodiments, the crosslinkable polymer further includes a hydrocarbylene repeat unit. The hydrocarbylene repeat unit can be a substituted or unsubstituted ($C_2$-$C_{15}$) hydrocarbylene. In some embodiments, the hydrocarbylene repeat unit is a substituted or unsubstituted ($C_2$-$C_4$) hydrocarbylene. For example, the hydrocarbylene repeat unit can be a substituted or unsubstituted ($C_2$-$C_4$) alkylene. Examples of substituted or unsubstituted ($C_2$-$C_4$) alkylene repeat units include repeat units derived from substituted styrenes such as 4-vinylbenzoic acid, 3-vinylbenzoic acid, 4-acetoxystyrene, and pentafluorophenyl 4-vinylbenzoate. In some embodiments, the hydrocarbylene repeat unit is —$CH_2CH_2$—.

In some embodiments, the hydrocarbylene repeat unit is about 50% to about 99% by weight of the crosslinkable polymer. For example, the hydrocarbylene repeat unit can about 55% to about 90%, about 60% to about 80%, or about 65% to about 75% by weight of the crosslinkable polymer or about 50%, 55%, 60%, 65%, 70%, 75%, 80%, 85%, 90%, or about 95% by weight of the crosslinkable polymer. In some embodiments, the hydrocarbylene repeat unit is about 68% by weight of the crosslinkable polymer.

In some embodiments, the crosslinkable polymer further includes an ester repeat unit having the structure:

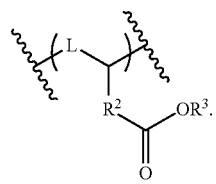

Each L is independently a substituted or unsubstituted ($C_1$-$C_{10}$) hydrocarbylene. Each $R^2$ is independently a bond or a substituted or unsubstituted ($C_1$-$C_{10}$) hydrocarbylene. Each $R^3$ is independently H or a substituted or unsubstituted ($C_1$-$C_{10}$) hydrocarbyl.

In some embodiments, each L is independently a substituted or unsubstituted ($C_1$-$C_4$) alkylene. In one example, each L or at least one L is —$CH_2$—.

In some embodiments, each $R^2$ is independently a substituted or unsubstituted ($C_1$-$C_8$) hydrocarbylene. In one example, each $R^2$ is independently a substituted or unsubstituted ($C_1$-$C_4$) alkylene. In some embodiments, $R^2$ is a bond.

In some embodiments, each $R^3$ is independently a substituted or unsubstituted ($C_1$-$C_8$) hydrocarbyl. For example, $R^3$ is independently a substituted or unsubstituted ($C_1$-$C_4$) alkyl (e.g., —$CH_3$, —$CH_2CH_3$, —$(CH_2)_2CH_3$, or —$(CH_2)_3CH_3$). In some embodiments, $R^3$ is —$CH_3$.

In some embodiments, the ester of the ester repeat unit can be hydrolyzed to allow binding to cements. For example, the ester functional groups in a composition including a (i) crosslinkable polymer including a pendant epoxide repeat unit and an ester repeat unit (ii) and amine crosslinker, or a crosslinked reaction product thereof, can be hydrolyzed after, or during crosslinking, to allow the composition, or crosslinked reaction product thereof, to bind to a cement in a subterranean formation. In some embodiments, a catalyst can be added to accelerate the rate of ester hydrolysis.

The crosslinkable polymer can include an ester repeat unit having the structure:

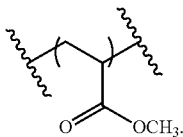

In some embodiments, the ester repeat unit is about 10% to about 40% by weight of the crosslinkable polymer. For example, the ester repeat unit can be about 15% to about 35% by weight of the crosslinkable polymer or about 10%, 15%, 20%, 25%, 30%, 35%, or 40% by weight of the crosslinkable polymer. In some embodiments, the ester repeat unit can be about 20% to about 30% by weight of the crosslinkable polymer. For example, the ester repeat unit can be about 24% by weight of the crosslinkable polymer.

In some embodiments, the crosslinkable polymer includes a pendant epoxide repeat unit having the structure:

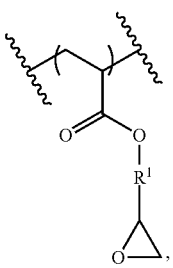

where each $R^1$ is —$CH_2$—; a hydrocarbylene repeat unit having the structure:

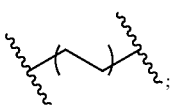

and
an ester repeat unit having the structure:

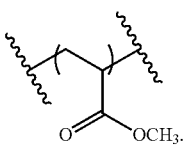

The pendant epoxide repeat unit can be about 5% to about 15% by weight of the crosslinkable polymer. The hydrocarbylene repeat unit can be about 60% to about 80% by weight of the crosslinkable polymer. The ester repeat unit can be about 20% to about 30% by weight of the crosslinkable polymer.

In some embodiments, the crosslinkable polymer has a melt index of about 4 g/10 min to about 8 g/10 min. For example, the crosslinkable polymer can have a melt index of about 4 g/10 min to about 6 g/10 min or about 6 g/10 min to about 8 g/10 min or about 4 g/10 min, 5 g/10 min, 7 g/10 min, or about 8 g/10 min. In some embodiments, the crosslinkable polymer has a melt index of about 6 g/10 min. The melt indexes were measured at 190° C. under 2.16 kg weight. "Melt index," also referred to as "melt flow index," is a measure of ease of flow of molten polymer. Specifically, it is a measure of how many grams of a polymer flow through the die in ten minutes. The test is performed at a given temperature depending on the plastic. The force used to push the plastic through the system is supplied by a weight which sits on top of a ram.

In some embodiments, the crosslinkable polymer has a melting point of about 50° C. to about 80° C. For example, the crosslinkable polymer can have a melting point of about 55° C. to about 75° C. or about 60° C. to about 70° C., or about 50° C., 55° C., 60° C., 70° C., 75° C., or about 80° C. In some embodiments, the crosslinkable polymer has a melting point of about 65° C.

In some embodiments, the crosslinkable polymer has a Vicat softening point of less than about 60° C. For example, the crosslinkable polymer can have a Vicat softening point of less than about 55° C., 50° C., or less than about 45° C. In some embodiments, the crosslinkable polymer has a Vicat softening point of less than about 40° C.

In some embodiments, the crosslinkable polymer has a tensile strength of about 3 MPa to about 5 MPa. For example, the crosslinkable polymer can have a tensile strength of about 4 MPa.

In some embodiments, the crosslinkable polymer has a Shore D hardness of about 10 to about 25. For example, the crosslinkable polymer can have a Shore D hardness of about 18.

Suitable examples of commercially available crosslinkable polymers include LOTADER® GMA grade polymers available from Arkema Corporation (France) and ELVALOY® polymers from Dupont (USA).

The amine crosslinker includes at least two primary amine groups. In some embodiments, the amine crosslinker includes a polyalkyleneimine, a polyetheramine, a polyalkylenepolyamine, an aliphatic amine, a polyfunctional aliphatic amine, an arylalkylamine, a heteroarylalkylamine, a chitosan, and combinations thereof. For example, the amine crosslinker can include at least one of a polyethyleneimine, a ethylenediamine, a diethylenetriamine (DETA), a triethylenetetramine (TETA), a tetraethylenepentamine (TEPA), a 1,2-propylenediamine, a 1,3-propylenediamine, a dipropylenetriamine, a tripropylenetetramine, a tetrapropylenepentamine, an ethylene propylene triamine, an ethylene dipropylene tetramine, a diethylene propylene pentamine, an ethylene tripropylene pentamine, a diethylene dipropylene pentamine, a triethylene propylene pentamine, a polyethylenimine (e.g, EPOMIN® from Nippon Shokubai, LUPASOL™ from BASF, LUPAMINE™ from BASF, etc.), a poly(ethyleneoxy)amine (e.g., JEFFAMINE® EDR-148 from Huntsman Corporation), a poly(propyleneoxy)amine (e.g., JEFFAMINE® T-403 from Huntsman Corporation, Polyetheramine T-5000 from BASF) or combinations thereof. Additionally, the amine crosslinker can be selected from the group consisting of a polyethyleneimine, a poly (ethyleneoxy)amine, a tetraethylenepentamine and combinations thereof. In some embodiments, the polyethyleneimine has a weight average molecular weight of about 1,000-1,000,000. For example, the polyethyleneimine can have a weight average molecular weight of about 5,00-5,000, 5,000-10,000, 10,000-50,000, 50,000-150,000, 150,000-500,000 or about 500,000 to about 1,00,000 or about 500, 1,000, 2,000, 3,000, 4,000, 5,000, 10,000, 25,000, 50,000, 100,000, 250,000, 500,000, 750,000 or about 1,000,000. In some embodiments, the polyethyleneimine has a weight average molecular weight of about 1,800 Da.

In some embodiments, the weight ratio of the crosslinkable polymer to the amine crosslinker is about 10:1 to about 1:2. For example, the weight ratio of the crosslinkable polymer to the amine crosslinker can be about 9:1 to about 1:1, about 7:1 to about 1:1, about 5:1 to about 1:1, about 4:1 to about 1:1, about 3:1 to about 1:1, or about 2:1 to about 1:1 or about, 10:1, 9:1, 8:1, 7:1, 6:1, 5:1, 4:1, 3:1, 2:1, 1:1, or about 1:2. One of ordinary skill in the art will appreciate that the ratio of the crosslinkable polymer to the amine crosslinker can be varied based on the desired properties of the crosslinked sealant to be formed and the desired gel time.

In some embodiments, the composition further comprises a carrier solvent. The carrier solvent can be a non-aqueous based fluid. The carrier solvent can be a hydrocarbon based fluid. In some embodiments, the carrier solvent can be selected from the group consisting of kerosene, xylenes, toluene, diesel, mineral oils, synthetic oils, paraffins, and combinations thereof. For example, the carrier solvent can be a mineral oil such as ESCAID® 110 or SARALINE 185V.

In some embodiments, the crosslinkable polymer and amine crosslinker are about 1% to about 30% by weight of the composition. For example, the crosslinkable polymer and amine crosslinker can be about 1% to about 30%, or about 2% to about 20% by weight of the composition or about 1%, 2%, 3%, 4%, 5%, 7%, 10%, 15%, 20%, 25%, or 30% by weight of the composition. In some embodiments, the crosslinkable polymer and amine crosslinker are about 3% to about 10% by weight of the composition. For example, the crosslinkable polymer and amine crosslinker can be about 6% to about 7% by weight of the composition. One of ordinary skill in the art will appreciate that the concentration of the crosslinkable polymer and the amine crosslinker to the carrier solvent can be varied based on the desired properties of the crosslinked sealant to be formed and the desired gel time.

In some embodiments, the composition has a gel time of less than about 120 hours at about 80° C. For example, the composition can have a gel time of less than about 120 hours at about 80° C. when the crosslinkable polymer and amine crosslinker are about 1% to about 5% by weight of the composition, about 5% to about 10%, about 10% to about 20%, or about 20% to about 30% by weight of the composition. In some embodiments, the composition has a gel time of less than about 120 hours at about 80° C. when the crosslinkable polymer and amine crosslinker are about 6% by weight of composition and the carrier solvent is diesel. For example, the composition can have a gel time of about 120 hours to about 48 hours at about 80° C. when the crosslinkable polymer and amine crosslinker are about 6% by weight of composition and the carrier solvent is diesel. In some embodiments, the composition has a gel time of less than about 120 hours at about 80° C. when the crosslinkable polymer and amine crosslinker are about 7% by weight of composition and the carrier solvent is xylenes. For example, the composition can have a gel time of about 120 hours to about 48 hours at about 80° C. when the crosslinkable polymer and amine crosslinker are about 6% by weight of composition and the carrier solvent is xylenes.

In some embodiments, the composition has a gel time of less than about 48 hours at about 80° C. For example, the composition can have a gel time of less than about 48 hours at about 80° C. when the crosslinkable polymer and amine crosslinker are about 1% to about 5% or about 5% to about 10% by weight of the composition, or about 1%, 2%, 3%, 4%, 5%, 6%, 7%, 8%, 9%, or about 10% by weight of the composition. In some embodiments, the composition has a gel time of less than about 24 hours at about 80° C. For example, the composition can have a gel time of less than about 24 hours at about 80° C. when the crosslinkable polymer and amine crosslinker are about 1% to about 5% or about 5% to about 10% by weight of the composition, or about 1%, 2%, 3%, 4%, 5%, 6%, 7%, 8%, 9%, or about 10% by weight of the composition. In some embodiments, the composition has a gel time of less than about 6 hours at about 80° C. For example, the composition can have a gel time of less than about 6 hours at about 80° C. when the crosslinkable polymer and amine crosslinker are about 1% to about 5% or about 5% to about 10% by weight of the composition, or about 1%, 2%, 3%, 4%, 5%, 6%, 7%, 8%, 9%, or about 10% by weight of the composition.

Also, provided in this disclosure is a composition including a crosslinkable polymer, an amine crosslinker, and a non-aqueous based fluid. The crosslinkable polymer includes a pendant epoxide repeat unit, a hydrocarbylene repeat unit, and an ester repeat unit. The pendant epoxide repeat unit has the structure:

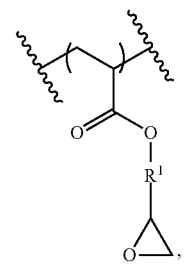

where each $R^1$ is —$CH_2$—. The hydrocarbylene repeat unit has the structure:

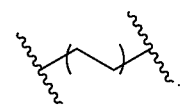

The ester repeat unit has the structure:

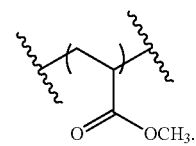

The pendant epoxide repeat unit is about 5% to about 15% by weight of the crosslinkable polymer. The hydrocarbylene repeat unit is about 60% to about 80% by weight of the crosslinkable polymer. The ester repeat unit is about 20% to about 30% by weight of the crosslinkable polymer. The amine crosslinker is selected from the group consisting of a polyethyleneimine having a weight average molecular weight of about 1,800 Da, a poly(ethyleneoxy)amine, a tetraethylenepentamine and combinations thereof. The non-aqueous based fluid is selected from the group consisting of diesel, xylenes, and combinations thereof. The crosslinkable polymer and amine crosslinker are about 3% to about 10% by weight of the composition.

Other Components.

In various embodiments, the composition including the crosslinkable polymer and the amine crosslinker can further include one or more suitable additional components. The additional components can be any suitable additional components, such that the composition can be used as described herein.

The composition can further include one or more fluids. The composition can include a fluid including at least one of dipropylene glycol methyl ether, dipropylene glycol dimethyl ether, dimethyl formamide, diethylene glycol methyl ether, ethylene glycol butyl ether, diethylene glycol butyl ether, propylene carbonate, D-limonene, a $C_2$-$C_{40}$ fatty acid $C_1$-$C_{10}$ alkyl ester, 2-butoxy ethanol, butyl acetate, furfuryl acetate, dimethyl sulfoxide, dimethyl formamide, diesel, kerosene, mineral oil, a hydrocarbon including an internal olefin, a hydrocarbon including an alpha olefin, xylenes, an ionic liquid, methyl ethyl ketone, and cyclohexanone. The composition can include any suitable proportion of the one or more fluids, such as about 0.001 wt. % to about 99 wt. %, about 20 wt. % to about 90 wt. %, or about 0.001 wt. % or less, or about 0.01 wt. %, 0.1, 1, 2, 3, 4, 5, 10, 15, 20, 30, 40, 50, 60, 70, 80, 85, 90, 91, 92, 93, 94, 95, 96, 97, 98, 99 wt. % or more of the composition.

The composition including the crosslinkable polymer and amine crosslinker, can be used in combination with any suitable downhole fluid before, during, or after the placement of the composition in a subterranean formation or the contacting of the composition and a subterranean material. For example, the can be pumped in combination with a downhole fluid above the surface, and then the combination composition is placed in a subterranean formation or contacted with a subterranean material. Alternatively, the composition can be injected into a subterranean formation to combine with a downhole fluid, and the combined composition is contacted with a subterranean material or is considered to be placed in the subterranean formation. In some embodiments, at least one of prior to, during, and after the placement of the composition in the subterranean formation or contacting of the subterranean material and the composition, the composition is used in the subterranean formation alone or in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof.

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

Also, provided herein are crosslinked reaction products of the crosslinkable polymer and the amine crosslinker. The crosslinked reaction product can form a sealant (e.g., a sealant gel). In some embodiments, the sealant is a stiff gel, a ringing gel, or a lipping gel. A 'stiff gel' may be defined as a gel that, when taken out of its container, retains its shape and does not deform. A 'ringing gel' is defined as a gel that when a container containing the gel is gently tapped on a hard surface, it will vibrate like a tuning fork. A 'lipping gel' is defined as a gel that when a container holding the gel is tilted, the gel will deform and tend to extend, elastically, in the direction of the tilt.

Method of Treating a Subterranean Formation.

Additionally, provided in this disclosure is a method of treating a subterranean formation. The method includes providing in a subterranean formation a composition including a crosslinkable polymer and an amine crosslinker. The crosslinkable polymer includes a pendant epoxide repeat unit. The pendant epoxide repeat unit has the structure

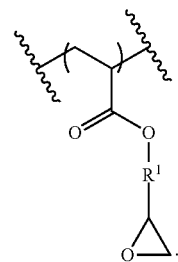

Each $R^1$ is independently a ($C_1$-$C_{10}$) alkylene or ($C_1$-$C_{10}$) alkylene ether. The number of oxygen atoms in each alkylene ether is governed at least in part by the number of carbon atoms in the alkylene ether. In some embodiments, each alkylene ether independently has a ratio of carbon atoms to oxygen atoms of 1:1 to 4:1. In one example, the alkylene ether includes ethylene oxide units, and the ratio of carbon atoms to oxygen atoms is 2:1. In another example, the alkylene ether include propylene oxide units, and the ratio of carbon atoms to oxygen atoms is 3:1. The method further includes crosslinking the composition to form a crosslinked product thereof.

In some embodiments, the crosslinked product thereof is a sealant. For example, the crosslinked product thereof can be a sealant gel.

In some embodiments, the providing, or forming the composition, occurs above-surface. The providing, or forming the compositin, can also occur in the subterranean formation. For example, the crosslinkable polymer can first be introduced into the subterranean formation and then the amine crosslinker can be introduced into the subterranean formation. Alternatively, the amine crosslinker can first be introduced into the subterranean formation and then the crosslinkable polymer can be introduced into the subterranean formation. In some cases, the two reactants can be injected as two separate streams and allowed to mix in the zone of interest.

In some embodiments, forming the sealant occurs near or within at least one of a casing, a casing-casing annulus, or in a tubing-casing annulus. In some embodiments, forming the sealant occurs in a void (e.g., cracks, microannuli, etc.) in at least one of a cement sheath and pipe.

In some embodiments, the sealant prevents or retards undesired loss or leak off of fluid into the formation.

Also, provided in this disclosure is a method of preventing or alleviating loss of drilling fluid or other fluid circulation in a wellbore penetrating a subterranean formation. In some embodiments, the composition including the crosslinkable polymer and amine crosslinker is provided in a weighted or unweighted "pill" for introduction into the wellbore. Such "pills" typically comprise the composition blended with a required amount of base oil or non-aqueous base drilling fluid and, in some cases, a weighting agent such as barite, calcium carbonate, or a salt. If a water based fluid needs to be used in combination, the two can be used as a two-phase fluid system. The amount of the composition used in the pill will depend on the size of the subterranean fracture, opening, or lost circulation zone to be treated. Multiple pills or treatments may be used if needed. In some embodiments, drilling is stopped while the pill comprising the composition is introduced into the wellbore. The composition can enter lost circulation zones or porous or fractured portions of the formation where it will prevent or retard the entry of drilling and other wellbore fluids. Further, pressure can be used to squeeze the pill into the lost circulation zone and de-fluidize a slurry.

Also, provided herein is a method of servicing a wellbore. The method includes providing a composition including a crosslinkable polymer and an amine crosslinker within a portion of at least one of a wellbore and a subterranean formation. The crosslinkable polymer includes a pendant epoxide repeat unit. The pendant epoxide repeat unit has the structure

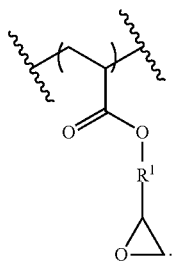

Each $R^1$ is independently a $(C_1-C_{10})$ alkylene or $(C_1-C_{10})$ alkylene ether. The number of oxygen atoms in each alkylene ether is governed at least in part by the number of carbon atoms in the alkylene ether. In some embodiments, each alkylene ether independently has a ratio of carbon atoms to oxygen atoms of 1:1 to 4:1. In one example, the alkylene ether includes ethylene oxide units, and the ratio of carbon atoms to oxygen atoms is 2:1. In another example, the alkylene ether include propylene oxide units, and the ratio of carbon atoms to oxygen atoms is 3:1.

In some embodiments, the composition is introduced into the at least one of a wellbore and a subterranean formation using a pump. The crosslinkable polymer and the amine crosslinker can be pumped together from at least one source or simultaneously from at least two different sources. Alternatively, the crosslinkable polymer can be pumped first and the amine crosslinker can be pumped second. Alternately, the amine crosslinker can be pumped first and the crosslinkable polymer can be pumped second.

EXAMPLES

A polymer according to the present disclosure was obtained from a commercial vendor.

The polymer contained an ethylene monomer at 68%, methyl acrylate at 24%, and glycidyl methacryate at 8% by weight. The polymer was dissolved in either diesel or xylenes to make 6% or 7% solutions respectively. The polymer had a melt index of 6 g/10 min, a melting point of 65° C., a Vicat softening point of <40° C., a tensile strength of 4 MPa, an elongation at break of 1100%, and Shore D hardness of 18.

The gel times at 180° F. are shown in Table 1 and demonstrate that polymers containing epoxy pendant groups can be used at low concentrations to provide competent gels which can resist gas flow when flow channels are treated with the resin compositions described. The additional advantage is the low cost of the formulations because of low polymer and cure agent loading and economical solvent systems, which do not involve reactive diluents such as those used in conventional epoxy cured systems. Furthermore, the potential exists for cement-induced hydrolysis of ester groups to generate carboxylate groups, which can bond cement and metal surfaces improving the bonding of the resin systems to the fracture surfaces.

TABLE 1

Table 1 - Curing of Solvent Based Solutions of ethylene terpolymers Containing Epoxyacrylate monomers with organic polyamines (Polymer concentration - 6% in diesel and 7% in xylenes)

| Crosslinker | Solvent | Polymer/Crosslinker wt ratio | Temp., ° F. | Gel Time, hrs | Comments |
|---|---|---|---|---|---|
| PEI (LMW) | Diesel | 4.5:1 | 180 | 120 hrs < CT > 48 hr | |
| | Diesel | 1:1 | 180 | 120 hrs < CT > 48 hr | |
| | Xylenes | 5.25:1 | 180 | 27 | |
| | Xylenes | 1.3:1 | 180 | 22 hrs < CT > 6 hr | |
| TEPA | Diesel | 4.5:1 | 180 | 22 hr < CT > 6 hr | |
| | Diesel | 1:1 | 180 | 22 hr < CT > 6 hr | |
| | Xylenes | 5.25:1 | 180 | 120 hr < CT > 48 hr | |
| | Xylenes | 1.3:1 | 180 | 30 | |
| Jeffamine EDR 148 | Diesel | 1:1 | 180 | 22 hr < CT > 6 hr | |
| | Xylenes | 1.2:1 | 180 | 120 hr < CT > 48 hr | |
| Polyamide (Dimer fatty acid/polyamine condensate) | Xylenes | 7:0.1 | 180 | 10 days | Soft set |

CT = Cure Time

In a comparative study, another polymer, which did not contain any epoxy containing monomers and, rather, only contained ethylene monomers at about 65% and butyl acrylate monomers at 35% by weight, was dissolved in xylenes to prepare 10% polymer solutions. Its curability was tested with the same curing agents as listed in Table 1 at 180° F. at similar polymer to cure agent ratios. No gels were formed even in 10 days. The polymer had a melt index of 260-350, a melting point of 65° C., Vicat softening temperature of <40° C., tensile strength of 2 MPA, and an elongation at break of 200% and Shore A hardness of 50. This may indicate that the amine or amide based cure agents reacted with the pendant epoxy groups and not the ester groups on the polymer because both the polymers contained ester monomers.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A liquid composition comprising:
a crosslinkable polymer comprising a pendant epoxide repeat unit,
wherein the pendant epoxide repeat unit has the structure:

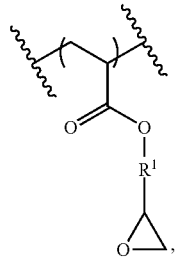

wherein each R1 is independently a (C1-C10) alkylene or (C1-C10) alkylene ether, each alkylene ether independently having a ratio of carbon atoms to oxygen atoms of 1:1 to 4:1;
a liquid solvent; and
an amine crosslinker, wherein the liquid solvent is a hydrocarbon fluid selected from the group consisting of kerosene, xylenes, toluene, diesel, mineral oils, napthenic oils, synthetic oils and paraffins.

2. The composition of claim 1, wherein the pendant epoxide repeat unit is about 1% to about 30% by weight of the crosslinkable polymer.

3. The composition of claim 1, wherein the crosslinkable polymer further comprises a hydrocarbylene repeat unit, wherein the hydrocarbylene repeat unit is a substituted or unsubstituted (C2-C15) hydrocarbylene.

4. The composition of claim 3, wherein the hydrocarbylene repeat unit is about 50% to about 99% by weight of the crosslinkable polymer.

5. The composition of claim 1, wherein the crosslinkable polymer further comprises an ester repeat unit having the structure

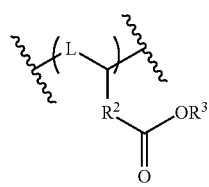

wherein
each L is independently a substituted or unsubstituted (C1-C10) hydrocarbylene;
each R2 is independently a bond or a substituted or unsubstituted (C1-C20) hydrocarbylene; and
each R3 is independently —H or a substituted or unsubstituted (C1-C10) hydrocarbyl.

6. The composition of claim 5, wherein the ester repeat unit is about 10% to about 40% by weight of the crosslinkable polymer.

7. The composition of claim 1, wherein the crosslinkable polymer comprises:
a pendant epoxide repeat unit having the structure:

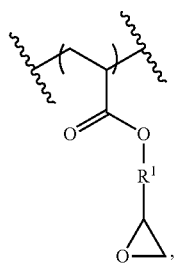

wherein each R1 is —CH2;
a hydrocarbylene repeat unit having the structure:

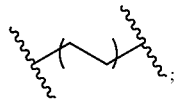

and
an ester repeat unit having the structure:

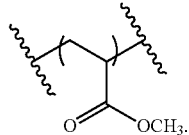

8. The composition of claim 1, wherein the crosslinkable polymer has a melt index of about 4 g/10 min to about 8 g/10 min.

9. The composition of claim 1, wherein the crosslinkable polymer has a melting point of about 50° C. to about 80° C.

10. The composition of claim 1, wherein the crosslinkable polymer has a Vicat softening point of less than about 60° C.

11. The composition of claim 1, wherein the crosslinkable polymer has a tensile strength of about 3 MPa to about 5 MPa.

12. The composition of claim 1, wherein the crosslinkable polymer has a Shore D hardness of about 10 to about 25.

13. The composition of claim 1, wherein the amine crosslinker comprises at least one of a polyalkyleneimine, a polyetheramine, a polyalkylenepolyamine, an aliphatic amine, a polyfunctional aliphatic amine, an arylalkylamine, a heteroarylalkylamine, a chitosan, and combinations thereof.

14. The composition of claim 13, wherein the amine crosslinker comprises at least one of a polyethyleneimine, an ethylenediamine, a diethylenetriamine (DETA), a triethylenetetramine (TETA), a tetraethylenepentamine (TEPA), a 1,2-propylenediamine, a 1,3-propylenediamine, a dipropylenetriamine, a tripropylenetetramine, a tetrapropylenepentamine, an ethylene propylene triamine, an ethylene dipropylene tetramine, a diethylene propylene pentamine, an ethylene tripropylene pentamine, a diethylene dipropylene pentamine, a triethylene propylene pentamine, a polyethylenimine, a poly(ethyleneoxy)amine, a poly(propyleneoxy)amine, and combinations thereof.

15. The composition of claim 1, wherein the weight ratio of the crosslinkable polymer to the amine crosslinker is about 10:1 to about 1:2.

16. The composition of claim 1, wherein the composition further comprises a carrier solvent.

17. The composition of claim 1, wherein the crosslinkable polymer and amine crosslinker are about 1% to about 30% by weight of the composition.

18. The composition of claim 1, wherein the composition has a gel time of less than about 120 hours at about 80° C.

19. A method of treating a subterranean formation comprising:

providing in a subterranean formation a liquid composition comprising a crosslinkable polymer comprising a pendant epoxide repeat unit, wherein the pendant epoxide repeat unit has the structure:

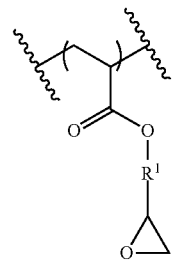

wherein each R1 is independently a (C1-C10) alkylene or (C1-C10) alkylene ether, each alkylene ether independently having a ratio of carbon atoms to oxygen atoms of 1:1 to 4:1;

a liquid solvent; and an amine crosslinker; and crosslinking the composition to form a sealant gel, wherein the liquid solvent is a hydrocarbon fluid selected from the group consisting of kerosene, xylenes, toluene, diesel, mineral oils, napthenic oils, synthetic oils and paraffins.

20. The method of claim 19, wherein crosslinking the composition to form the sealant gel occurs near a casing, a casing-casing annulus, a tubing-casing annulus, or in a void in at least one of a cement sheath and a pipe, and crosslinking the composition to form the sealant gel prevents or retards undesired loss or leak off of fluid into the formation.

* * * * *

UNITED STATES PATENT AND TRADEMARK OFFICE
CERTIFICATE OF CORRECTION

PATENT NO. : 10,005,930 B2
APPLICATION NO. : 15/263661
DATED : June 26, 2018
INVENTOR(S) : B. Raghava Reddy It is certified that error appears in the above-identified patent and that said Letters Patent is hereby corrected as shown below:

On the Title Page (*) Notice, Line 3, after "0 days." delete "days.".

In the Claims

Column 23, Line 35, Claim 1, delete "R1" and insert --$R^1$--.

Column 23, Line 35, Claim 1, delete "(C1-C10)" and insert --$(C_1-C_{10})$--.

Column 23, Line 36, Claim 1, delete "(C1-C10)" and insert --$(C_1-C_{10})$--.

Column 23, Line 43, Claim 1, delete "napthenic" and insert --naphthenic--.

Column 23, Line 50, Claim 3, delete "(C2-C15)" and insert --$(C_2-C_{15})$--.

Column 24, Line 3, Claim 5, delete "(C1-C10)" and insert --$(C_1-C_{10})$--.

Column 24, Line 4, Claim 5, delete "R2" and insert --$R^2$--.

Column 24, Line 5, Claim 5, delete "(C1-C20)" and insert --$(C_1-C_{20})$--.

Column 24, Line 6, Claim 5, delete "R3" and insert --$R^3$--.

Column 24, Line 7, Claim 5, delete "(C1-C10)" and insert --$(C_1-C_{10})$--.

Column 24, Line 28, Claim 7, delete "R1" and insert --$R^1$--.

Column 24, Line 28, Claim 7, delete "-CH2" and insert -- $-CH_2$;--.

Signed and Sealed this
Eighteenth Day of June, 2019

Andrei Iancu
*Director of the United States Patent and Trademark Office*

CERTIFICATE OF CORRECTION (continued)
U.S. Pat. No. 10,005,930 B2

Column 26, Line 13, Claim 19, delete "R1" and insert --$R^1$--.

Column 26, Line 13, Claim 19, delete "(C1-C10)" and insert --$(C_1-C_{10})$--.

Column 26, Line 14, Claim 19, delete "(C1-C10)" and insert --$(C_1-C_{10})$--.

Column 26, Line 22, Claim 19, delete "napthenic" and insert --naphthenic--.